(12) United States Patent
Ng et al.

(10) Patent No.: US 7,991,906 B2
(45) Date of Patent: Aug. 2, 2011

(54) METHOD OF DATA REQUEST SCHEDULING IN PEER-TO-PEER SHARING NETWORKS

(75) Inventors: Chun Yin Ng, Hong Kong (CN); Kang Heng Wu, Yunfu (CN); Liang Qiao Chen, Shenzhen (CN); Tak Wing Lam, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 433 days.

(21) Appl. No.: 12/331,360

(22) Filed: Dec. 9, 2008

(65) Prior Publication Data

US 2010/0146138 A1 Jun. 10, 2010

(51) Int. Cl.
*G06F 15/16* (2006.01)
*G06F 12/00* (2006.01)

(52) U.S. Cl. ........................................ 709/231; 709/205

(58) Field of Classification Search .................. 709/205, 709/223–225, 229, 231–236, 250
See application file for complete search history.

(56) References Cited

U.S. PATENT DOCUMENTS

| | | | |
|---|---|---|---|
| 2004/0008635 A1* | 1/2004 | Nelson et al. ................. | 370/260 |
| 2007/0094405 A1* | 4/2007 | Zhang ........................... | 709/231 |
| 2007/0230361 A1* | 10/2007 | Choudhury .................. | 370/250 |
| 2008/0037527 A1 | 2/2008 | Chan et al. | |
| 2008/0140853 A1 | 6/2008 | Harrison | |
| 2008/0155120 A1 | 6/2008 | Argawal et al. | |
| 2008/0256463 A1* | 10/2008 | Li et al. ........................ | 715/756 |

* cited by examiner

*Primary Examiner* — Zarni Maung
(74) *Attorney, Agent, or Firm* — Fulbright & Jaworski L.L.P.

(57) ABSTRACT

Systems and methods are provided for scheduling data requests for streaming media data in a Peer-to-Peer (P2P) network. A method is provided to increase a peer's contribution to the whole P2P network by partitioning the data chunks to request into several regions according to their relative time urgency, and data requests are scheduled in an effort to maintain availability of data in each region to a corresponding predefined target amount.

25 Claims, 6 Drawing Sheets

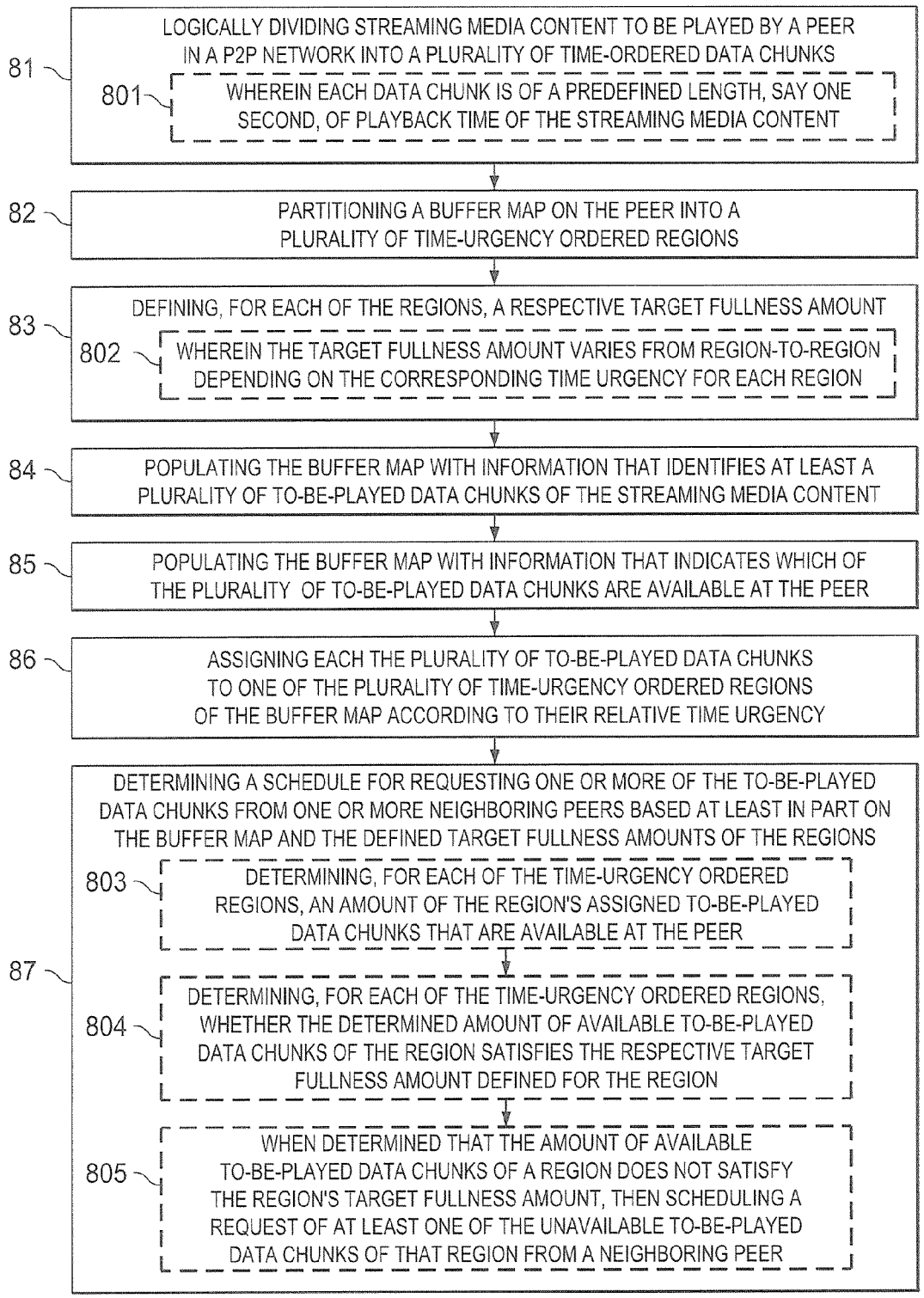

METHOD OF DATA REQUEST SCHEDULING IN PEER-TO-PEER SHARING NETWORKS

TECHNICAL FIELD

The following description relates generally to peer-to-peer (P2P) networks and methods for scheduling data requests in P2P networks, and more particularly to systems and methods for scheduling data requests for live streaming media data in a P2P network.

BACKGROUND

Content providers often stream data, such as audio, video, and/or other content from one or more servers to requesting clients via a content distribution network (CDN). As an example, music or movies may be delivered to desktops of distributed users with low delay and free interactivity (supporting, for example, pause, jump, fast-forward, rewind, etc.). "Streaming media" as used herein refers to any type of data (e.g., audio, video, and/or other types of content) that is communicated to a recipient in a streaming fashion such that the recipient may begin playback of the streaming data before all of the streaming data is received by the recipient (i.e., the recipient may playback a received portion of the streaming data while portions of the streaming data to be played in the future continue to be received by the recipient). Streaming media is a well-known technology in the computer arts. In general, streaming media presents data (e.g., typically audio and/or video) to a client in a streaming or continuous fashion. That is, with streaming media a client is not required to receive all of the information to be presented before the presentation begins. Rather, playback of content in a streaming media file may begin before all of the file is received by the client, and as the received portion of the file is being played back, further portions of the file continue to be received by the client for later playback.

Various streaming media players are well-known in the art. Popular streaming media players include those provided by RealNetworks™ (see http://www.realnetworks.com), such as its RealPlayer™ and RealOnePlayer™ streaming media players, and that used by Microsoft's Windows® Media Player (see http://www.microsoft.com), as examples. Typically, each streaming media player has a buffer associated therewith for buffering received streamed data to improve the continuity of the playback of such streamed data by the streaming media player (e.g., in order to maintain a substantially smooth playback of the streaming data).

A traditional client-server model, where a dedicated stream is established between each requesting client and the server, has limited scalability due mainly to heavy server load and limited network bandwidth at the server side. More recently, peer-to-peer (P2P) networks have been increasing in popularity for many scalable applications, such as streaming and file sharing among users over the world. In P2P systems, cooperative peers self-organize themselves into overlay networks, typically via unicast tunnels. Each peer may be a personal computer (PC), laptop computer, personal data assistant (PDA), mobile telephone, or other processor-based computing device that is communicatively coupled to the P2P network. Each peer (sometimes called an overlay node in an overlay network) acts as an application-layer proxy, caching and relaying data for other peers. In addition, by sharing their own resources, such as storage and network bandwidth, the capacity of the whole system is vastly amplified compared to traditional client-server architecture. Thus, end-systems (e.g., clients) often form a P2P network, wherein the end-systems, acting as peers, may share data with each other. For instance, an end-system acting as a peer may contribute its bandwidth and storage to aid in the distribution of content among the peers.

Various P2P technologies have been proposed. As one example, U.S. Patent Application Publication No. 2008/0155120 A1 titled "METHOD AND SYSTEM FOR PEER-TO-PEER CONTENT DISSEMINATION" (hereinafter "the '120 Publication") proposes use of a P2P network for content dissemination among peers. According to the '120 Publication, a sender decides how much data to send according to the number of bytes it has received from the requester (see e.g., paragraphs 0050-0055 of the '120 Publication). The goal of the '120 Publication is to prevent malicious attack or a selfish peer in the P2P network. However, the '120 Publication does not address live streaming content, and its proposed solution does not appear to be suitable for live streaming content due, for instance, to its relatively long response time.

As another example, U.S. Patent Application Publication No. 2008/0140853 A1 titled "PEER-TO-PEER STREAMING OF NON-LIVE CONTENT" (hereinafter "the '853 Publication") proposes another use of a P2P network for streaming of non-live content. The '853 Publication's method is based on BitTorrent, a known scheduling algorithm that relies on a rarest-first strategy. The '853 Publication does not address live streaming content, and its proposed solution employing the BitTorrent scheduling algorithm does not appear to be suitable for live streaming content due, for instance, to its lack of time-sensitivity regarding the data being requested.

As still a further example, U.S. Patent Application Publication No. 2008/0037527 A1 titled "Peer-to-Peer Interactive Media-on-Demand" (hereinafter "the '527 Publication") proposes a method for media-on-demand (MoD) communications in a P2P network. The '527 Publication proposes structuring and storing registration information including media information, play start time and locality of registering peer node. Then, upon receiving a request, a determination is made of a list of parent nodes that can optimally provide media downloading service to requesting peer in dependence of media information requested, its media play start time and locality information of requesting peer. Then, the requesting peer is connected to at least one of the parents to receive, buffer and play the media.

The '527 Publication proposes that each peer client buffers the media it has played for a certain period of time, depending on the size of its buffer. The client buffer is divided into three parts: 1) just played, which caches the media the peer has played; 2) ready to play, which stores the stream received and ready to be played; and 3) collecting, which is a space for collecting the stream from multiple parents (see e.g, paragraphs 0038-0041 of the '527 Publication). In the '527 Publication, for a peer y to become a parent of another peer x, its just played buffer must contain the stream data which is being collected by x. The '527 Publication proposes use of DHT, an efficient P2P searching technique, to identify parents for a peer to connect to, see e.g., paragraphs 0043-0046 of the '527 Publication.

The '527 Publication further explains its process as follows in paragraph 0047:

After connecting to several parents, the peer needs to coordinate its parents for streaming non-overlapping parts of the media. The preferred embodiment divides each media [into] W segments with each segment containing 1-second media, and then divides each segment further into M equal-sized blocks. For example, 1-second video of bitrate 450 kbps is divided into 64 blocks, and thus each block is about 900 bytes which fits into one packet. For each segment of media, a bitmap representation is sent to a parent fort [sp: "for"] requesting data blocks from that parent. Each block in the segment is represented by one bit, with the bit set to 1 indicating requesting block. With another 2-byte segment number, all data blocks in the media can be identified uniquely.

The '527 Publication focuses on video-on-demand content distribution, and does not address live streaming content, for example.

A desire exists for an alternative and/or improved technique for scheduling data requests in a P2P network, particularly for a scheduling technique that is suitable for scheduling peer data requests for live streaming data.

BRIEF SUMMARY

The present invention is directed generally to a system and method for scheduling data requests in a P2P network, and more particularly to systems and methods for scheduling data requests for streaming media data. According to embodiments of the present invention, a method is provided to increase a peer's contribution to the whole P2P network by partitioning the data chunks to request into several regions according to their relative time urgency, and data requests are scheduled in an effort to maintain availability of data in each region to a corresponding predefined target amount.

Embodiments of the present invention are particularly suitable for use in scheduling data requests for live streaming data. As used herein, "live streaming content (or data)" refers to media streams that are created (e.g., continuously) after streaming starts. Thus, in a live stream, later portions of the stream continue to be created while earlier-created portions of the stream are being streamed to recipient(s). In this sense, live streaming differs from non-live streaming which requires all the meta data (e.g. time stamps, number of bytes per encoded frames, etc.) to be created before streaming of the content begins. With all meta information and real media data available before streaming starts, a non-live streaming client (e.g., a peer in a P2P network) may schedule to pull data from any point of the stream. For live streaming, bitstreams are encoded as time goes by. Thus, live streaming clients usually need to keep only a reasonable short delay, say a few seconds to a few minutes. All players in a live P2P system have limited memory, and therefore the player usually buffers only limited duration of media data after they are played, and therefore some old data might not exist in the network after some time. This implies an urgency consideration, which embodiments of the present invention are suitable for addressing. One example of a practical live streaming system is the air broadcast of television programs.

According to one embodiment, a buffer map is created and maintained on each peer within a P2P network, where such buffer map identifies at least a future portion of streaming media to be played by the peer. As discussed further herein, the buffer map may further identify previously-played portions of streaming media that remain buffered at the peer. The future portion of streaming media to be played is logically divided into a plurality of data chunks. For example, each data chunk may correspond to a certain length of playback time (e.g., 1 second) of the streaming media. The chunks may be arranged in time-urgent fashion (e.g., according to when each chunk is scheduled to be played in the streaming media playback) in the buffer map.

According to an embodiment, the time-ordered chunks identified in the buffer map are then divided into respective time-urgent regions. As one example, a first region may be defined as from M to M+7 (i.e., $Region_1=\{M, M+1, \ldots, M+7\}$), where M is the current playback position of the peer; a second region may be defined as from M+8 to M+23 (i.e., $Region_2=\{M+8, M+9, \ldots, M+23\}$); and a third region may be defined as from M+24 to M+60 (i.e., $Region_3=\{M+24, M+25, \ldots, M+60\}$).

Thus, a plurality of time-urgency ordered regions are created with corresponding data chunks assigned to a corresponding one of the regions based on the respective time-urgency of such data chunk. For instance, a first region of great time urgency includes a number of data chunks that are of immediate time urgency (e.g., about to be played by the peer over the upcoming, say 8 seconds, such as in the above example of $Region_1$); a second region of lesser time urgency (e.g., an intermediate time urgency) includes a number of data chunks that are not of immediate time urgency but that are due to be played following playback of the first region of data chunks; and a third region of even lesser time urgency (e.g., a minimal time urgency) includes a number of data chunks that are not due to be played following playback of the second region of data chunks. While three regions are discussed in this example, it should be recognized that embodiments of the present invention are not restricted to three regions, but may instead employ any number "N" of regions that vary in their time urgency (e.g., that vary from a most time urgent region to a least time urgent region).

As playback occurs on the peer and the playback position of "M" moves forward, the region assignment of the time-ordered data chunks changes accordingly. For instance, in the above example, when the playback position M advances forward by one second (i.e., M=M+1), the region assignments of the data chunks may be updated accordingly. Thus, as playback progresses, data chunks previously assigned to $Region_3$ in this above example are upgraded to be assigned to $Region_2$, and likewise data chunks previously assigned to $Region_2$ are upgraded to be assigned to $Region_1$ as their playback time nears.

A corresponding bitmap may be maintained in the buffer map that identifies which of the data chunks is available at the peer. A data chunk is referred to as being "available" herein when all of its data packets have been received. The bitmap may be implemented in any suitable manner for identifying which of the data chunks is available at the peer. According to one embodiment, the bit map includes either a "1" or a "0" for each data chunk identified in the buffer map, where a "1" indicates that the corresponding chunk is available and a "0" indicates that the corresponding chunk is not available. The buffer map may further include identification of certain chunks of data that are buffered at the peer, which the peer has completed playing and which may be available to communicate from the peer to a neighboring peer who requests such chunks of data.

Chunks of data that are earlier in the time-ordering of the data chunks than the current playback position (e.g., previously-played chunks) may be referred to by a "buffer_offset". The current playback position may be referred to by a "play_offset(M)". Thus, for example, a buffer mapping data structure may have the form: {buffer_offset, play_offset(M), bitmap}. An example of such a buffer map data structure for a peer may be: {80, 84, 1111 1111 0000 1010}, which indicates that the buffer_offset position begins at chunk ID 80, and the current play_offset(M) is at chunk ID 84; and the bitmap portion of this data structure indicates that data chunks 80-83 are available (as indicated by the first four "1's" in the bitmap), data chunks 84-87 are available (as indicated by the second four "1's" in the bitmap), data chunks 88-91 are not available (as indicated by the next four "0's" in the bitmap), and data chunks 92 and 94 are available but data chunks 93 and 95 are not yet available (as indicated by the final "1010" in the bitmap).

Desired fullness rules may be defined for each of the time-urgency ordered regions of the buffer map. That is, a desired amount of (e.g., percentage of) data chunks that are desired to be available in each of the defined regions may be defined. According to embodiments of the present invention, a peer's scheduler requests data from other peers according to fullness rules defined for each of the regions in the peer's buffer map.

For instance, a target amount of $F_1$ fullness may be defined for $Region_1$, a target amount of $F_2$ fullness may be defined for $Region_2$, and a target amount of $F_3$ fullness may be defined for $Region_3$. Generally, the higher-urgency regions have a higher target fullness amount defined. For instance, $F_1$ may be defined as 100%, where 100% of the data chunks in $Region_1$ are desired to be available at the peer; $F_2$ may be defined as 50%, where 50% of the data chunks in $Region_2$ are desired to be available at the peer; and $F_3$ may be defined as 30%, where 30% of the data chunks in $Region_3$ are desired to be available at the peer. The peer's scheduler may monitor the fullness of the regions of the peer's buffer map, and schedules requests of data chunks from other peers based at least in part on the defined target amount of fillness desired to be maintained for each region.

According to one embodiment, the scheduler determines for all regions $\{1, 2, \ldots, N\}$, whether the region meets its defined fullness target, and if a region does not meet its defined fullness target, the scheduler chooses one unavailable chunk from that region that has not yet been requested from another peer (i.e., is not in the request queue ($Q_{Req}$)). In certain embodiments, an unavailable chunk from the region may be randomly selected by the scheduler. Thus, the chunks need not be selected in time-ordered fashion, but rather the chunks may be selected for requesting their data from another peer in a non-sequential manner.

The peer may periodically exchange buffer maps with its neighboring peers, and thus the peer's scheduler can determine from the neighbor buffer maps which neighbors have the chosen chunk. The scheduler may select one of the neighbor peers ($P_k$) that has the chosen chunk, and sends a request to such selected neighbor peer $P_k$ requesting the chosen chunk of data. In certain embodiments, the one of the neighbor peers having the chosen chunk from which the chunk is requested may be selected randomly by the scheduler.

Embodiments of the present invention provide a method to schedule which unavailable data chunk to request first for a peer. Embodiments employ a region-based buffer map that is partitioned by time urgency. Non-sequential requests within a given region may be made such as to enhance sharing probability. Certain embodiments employ a scheduling algorithm that try to prevent request of data at earlier time before last seconds. Scheduling is based on local buffer fullness (chunk availability) and neighboring peers without knowing the global status. Thus, certain embodiments increase the sharing probability, i.e. the chance that neighboring peers have some chunks of data needed by a given peer and that the given peer has some chunks of data that neighboring peers need.

Embodiments of the present invention may be used under pull-based P2P live (real-time) streaming network. Pull-based means chunks are sent upon request. Peers have a means to obtain the buffer map status from its neighbors. A media channel in a P2P live streaming system may be watched by many users. A live video may be divided into media chunks (e.g., each chunk having one second of media data), and the live video may be made available from a source peer. Each receiving peer that is viewing the video caches and shares chunks with other peers viewing the same video.

According to certain embodiments of the present invention, chunks of media data are prioritized according to their time urgency. Data requests are scheduled to be serviced to keep buffer fullness/emptiness at a certain level to increase global contribution and enhance the playback smoothness. Thus, embodiments of the present invention provide a method to increase a peer's contribution to the whole P2P network by partitioning the data chunks to request into several regions according to their time urgency and keeping the availability of data to a certain level. Accordingly, embodiments of the present invention enable an increase in P2P sharing efficiency such as to decrease the network resources needed to provide the content.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 8 shows another exemplary operational flow diagram according to one embodiment of the present invention.

DETAILED DESCRIPTION

Figure 1:
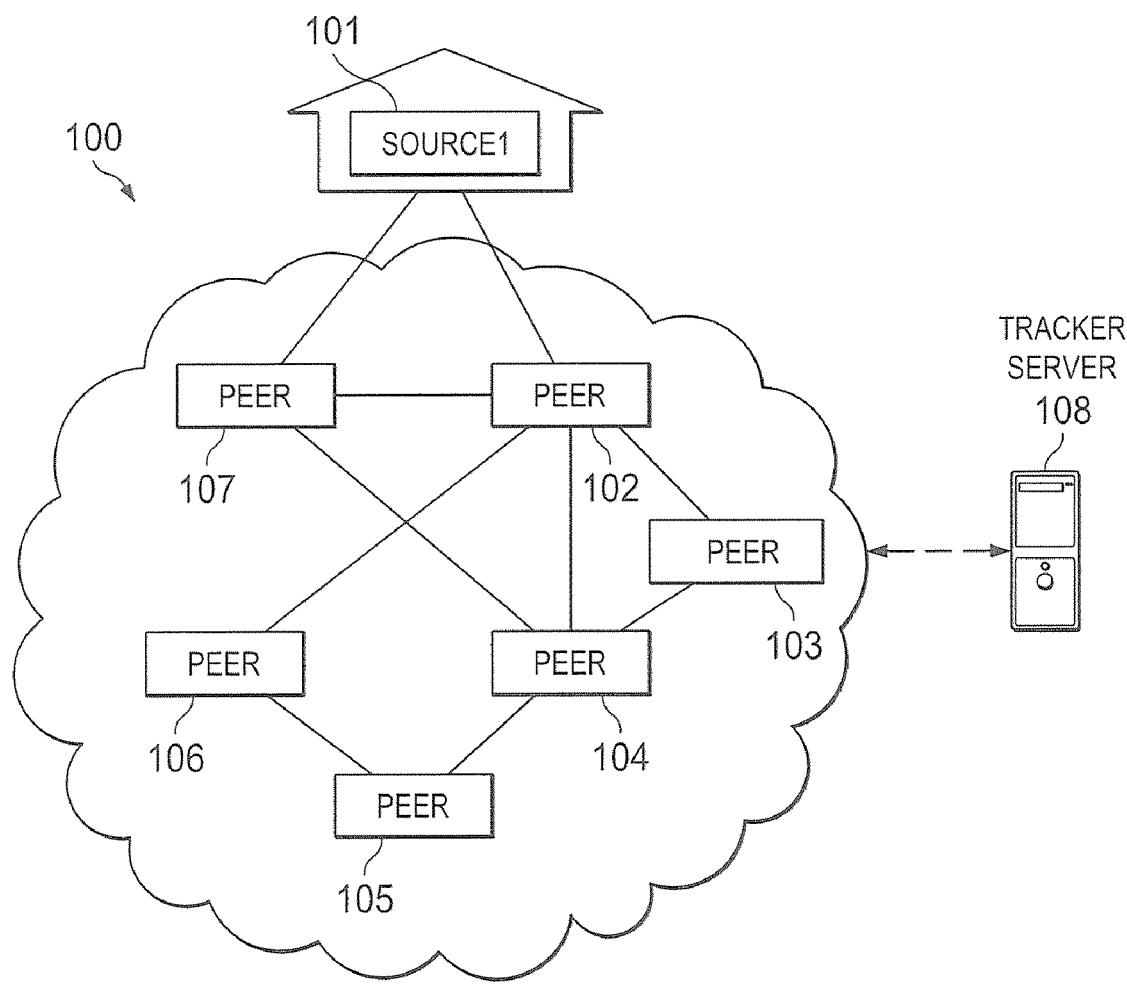
FIG. 1 shows a block diagram of an exemplary P2P network according to one embodiment of the present invention.

FIG. 1 shows a block diagram of an exemplary P2P network 100 according to one embodiment of the present invention. Exemplary P2P network 100 includes a source peer (SP) 101 and various receiving peers (RPs) 102-107. Each peer 101-107 may be a personal computer (PC), laptop computer, personal data assistant (PDA), mobile telephone, or other processor-based computing device that is communicatively coupled to one or more neighboring peers via the P2P network 100.

SP 101 encodes/creates the stream of content in this example. That is, in certain embodiments, SP 101 comprises a live encoder to create the live media stream in the P2P network 100. RPs 102-107 desire to receive the stream of content. Each peer (SP/RP) has its own set of neighbors. Not every peer is required to have SP 101 in its neighbor list. So, SP 101 may send live streaming content onto the network 100, and different RPs 102-107 may desire to receive the streaming content. Rather than each of the RPs 102-107 being served the streaming content from SP 101, one or more of the RPs 102-107 may instead request and receive at least a portion of the streaming content from other RPs 102-107. Different RPs 102-107 may have different play offsets, as discussed further herein. That is, the different RPs may not be playing the live content at precisely the same time in a synchronized fashion.

The neighboring peers of each peer in the P2P network may be determined in any of various ways known in the art for implementing P2P networks. As one example, the peers may exchange information with each other to enable each peer to compile its respective neighbor peer list. As another example, a tracker server 108 may be implemented for tracking the peers in the P2P network. For instance, peers may register with the tracker server 108, and the tracker server 108 may determine and communicate to each peer its respective neighbor peer list.

As discussed further herein, each peer maintains a buffer map that identifies at least a future portion of streaming media to be played by the peer. As discussed further herein, the buffer map may also identify previously-played portions of streaming media that remain buffered at the peer. Buffer maps can be obtained from neighboring peers to reflect the data availabilities at each peer. For instance, in certain embodiments, the neighboring peers may periodically exchange their respective buffer maps with each other. According to certain embodiments, data requests are determined by a peer's scheduler purely based on local demand and neighboring buffer maps. As discussed further herein, the buffer map is divided/partitioned into a plurality of levels that each contain data chunks having different relative time urgencies. A fullness target is predefined for each region of the buffer map, and the scheduler schedules data requests in attempt to satisfy the fullness target of each region.

Figure 2:
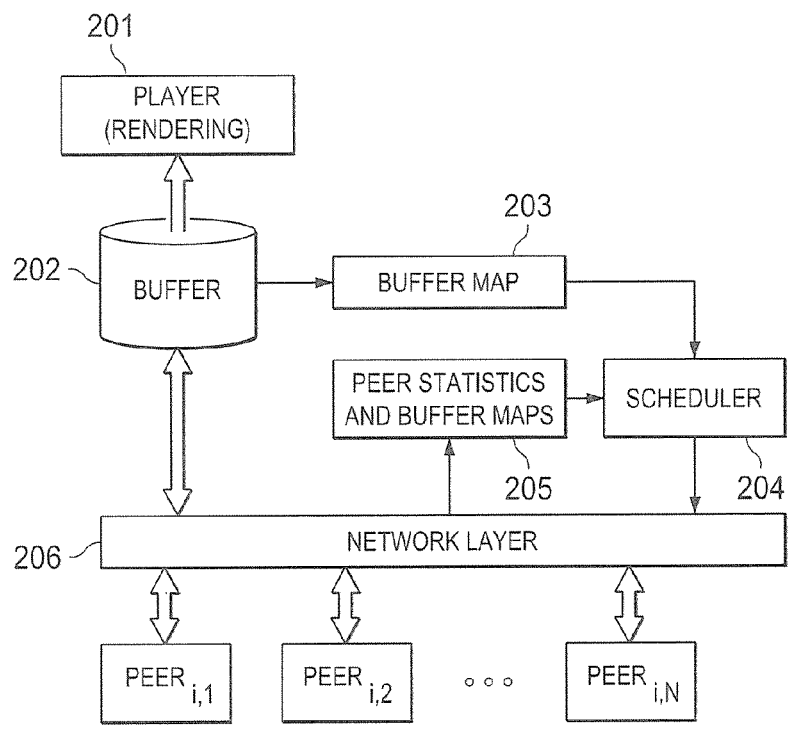
FIG. 2 shows a block diagram of an exemplary architecture of a given receiving peer, $P_i$, according to one embodiment of the present invention.

FIG. 2 shows a block diagram of an exemplary architecture of a given receiving peer, $P_i$, according to one embodiment of the present invention. The exemplary architecture shown in FIG. 2 may be employed for each of the receiving peers 102-107 of FIG. 1, for instance. As shown in FIG. 2, $P_i$ includes a player 201 for rendering streaming content received by $P_i$. Such player 201 may comprise any suitable streaming media player, such as a media player provided by RealNetworks™ (see http://www.realnetworks.com), such as its RealPlayer™ and RealonePlayer™ streaming media players, or Microsoft's Windows® Media Player (see http://www.microsoft.com), as examples, as examples. Buffer 202 is included to buffer streaming content to be played by player 201, thereby enabling player 201 to render the streaming content playback in a smooth, substantially uninterrupted manner. Various buffering techniques for streaming media players are well-known in the art.

Further, a buffer map 203 is included. Buffer map 203 includes information identifying at least a future portion of streaming media file to be played by the peer $P_i$. As discussed further herein, buffer map 203 may also identify previously-played portions of the streaming media file that remain buffered at the peer $P_i$ in buffer 202. As discussed further herein, the to-be-played portion of the streaming media file that is identified in the buffer map 203 is logically divided into a plurality of data chunks. For example, each data chunk may correspond to a certain length of playback time (e.g., 1 second) of the streaming media file. The chunks may be arranged in time-urgent fashion (e.g., according to when each chunk is scheduled to be played in the streaming media playback) in the buffer map 203.

According to one embodiment, the time-ordered chunks identified in buffer map 203 are then divided into respective time-urgent regions. As one example, a first region may be defined as from M to M+7 (i.e., $Region_1 = \{M, M+1, \ldots M+7\}$), where M is the current playback position of the peer; a second region may be defined as from M+8 to M+23 (i.e., $Region_2 = \{M+8, M+9, \ldots, M+23\}$); and a third region may be defined as from M+24 to M+60 (i.e., $Region_3 = \{M+24, M+25, \ldots, M+60\}$).

Thus, a plurality of time-urgency ordered regions are created with corresponding data chunks assigned to a corresponding one of the regions based on the respective time-urgency of such data chunk. For instance, a first region of great time urgency includes a number of data chunks that are of immediate time urgency (e.g., about to be played by the peer over the upcoming, say 7 seconds, such as in the above example of $Region_1$); a second region of lesser time urgency (e.g., an intermediate time urgency) includes a number of data chunks that are not of immediate time urgency but that are due to be played following playback of the first region of data chunks; and a third region of even lesser time urgency (e.g., a minimal time urgency) includes a number of data chunks that are not due to be played following playback of the second region of data chunks. While three regions are discussed in this example, it should be recognized that embodiments of the present invention are not restricted to three regions, but may instead employ any number "N" of regions that vary in their time urgency (e.g., that vary from a most time urgent region to a least time urgent region).

As playback occurs on the peer and the playback position of "M" moves forward, the region assignment of the time-ordered data chunks changes accordingly. For instance, in the above example, when the playback position M advances forward by one second (i.e., M=M+1), the region assignments of the data chunks may be updated accordingly. Thus, as playback progresses, data chunks previously assigned to $Region_3$ in this above example are upgraded to be assigned to $Region_2$, and likewise data chunks previously assigned to $Region_2$ are upgraded to be assigned to $Region_1$ as their playback time nears.

A corresponding bitmap may also be maintained in buffer map 203 that identifies which of the data chunks is available at the peer. As discussed further herein, a scheduler 204 determines, based at least in part on buffer map 203, a data chunk to request from a neighboring peer.

Also, in the illustrated embodiment of FIG. 2, a peer statistics and buffer maps 205 is further included. Periodically, such as once every second, buffer maps may be exchanged between each neighboring peer, in certain embodiments. Thus, peer statistics and buffer maps 205 may include the buffer maps of neighboring peers of peer $P_i$. As discussed further herein, scheduler 204 may determine from such peer statistics and buffer maps 205 one or more neighboring peers from which a data chunk that is needed by peer $P_i$ is available. Thus, scheduler 204 may use information from buffer map 203 (e.g., to identify data chunks needed by peer $P_i$) and/or peer statistics and buffer maps 205 (e.g., to identify one or more neighboring peers that have a needed data chunk available) in order to schedule data requests for requesting data for $P_i$ from its neighboring peers, as discussed further herein.

The data in buffer 202, buffer map 203, and peer statistics and buffer maps 205 may be stored to any suitable computer-readable data storage device (e.g., hard drive, memory, or other suitable computer-readable data storage device) in any suitable form, such as a file, database, data structure, etc. Further, player 201 and scheduler 204 may each be implemented with hardware logic and/or computer-executable software code to perform the respective operations described herein as being performed thereby. For instance, in certain embodiments, computer-executable software code is stored to a computer-readable medium (e.g., hard drive, memory, or other suitable computer-readable data storage device) and is executed by a processor (e.g., CPU) of peer $P_i$ for causing peer $P_i$ to perform the actions described herein for player 201 and scheduler 204.

Peer $P_i$ of FIG. 2 further includes a network layer 206 for communicatively coupling, via a communication network, with other peers, such as $P_{i,1}, P_{i,2}, \ldots, P_{i,N}$, where N is the total number of neighbor peers of peer $P_i$. That is, peer $P_{i,j}$ refers to the j'th neighboring peer of peer $P_i$.

Figure 3:
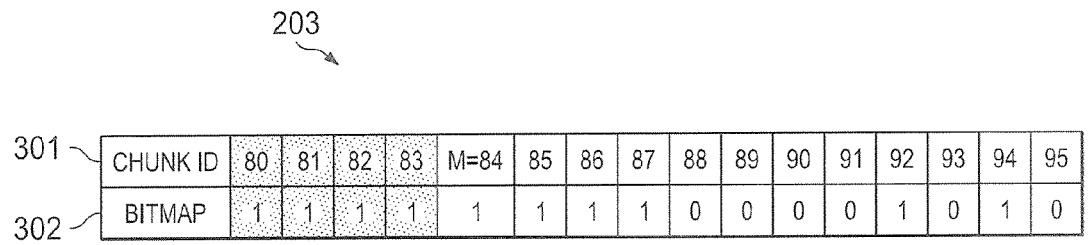
FIG. 3 shows an exemplary buffer map that may be implemented on the peer of FIG. 2 according to one embodiment of the present invention.

FIG. 3 shows an exemplary buffer map 203 according to one embodiment of the present invention. In this example, buffer map 203 includes a row of Chunk IDs 301 and an associated bitmap 302 that indicates which of the chunks are currently available at peer $P_i$. In this example, the streaming media data (e.g., audio and video and system information, e.g. timestamps) are multiplexed into a single P2P packet stream. Each second (or other predefined time period) of media data is grouped into a chunk (identified with a corresponding Chunk ID in row 301). Each chunk of data may be further divided into multiple packets. In the exemplary buffer map 203 shown in FIG. 3, chunk IDs 80-95 are identified. The chunks are time-ordered portions of the streaming media file being played by peer $P_i$. Thus, for example, chunk ID 80 identifies a chunk of data that plays for a first second, then chunk ID 81 identifies a chunk of data that plays for a next second, and so on. Bitmap 302 includes, for each of the chunks identified in row 301, either a "1" or a "0", where a 1 indicates that the associated chunk is available at peer $P_i$ (e.g., stored to buffer 202 of FIG. 2) and a 0 indicates that the associated chunk is not available at peer $P_i$.

In the illustrated example, previously-played chunks of data (i.e., that are earlier in the time-ordering than the current playback position) may be referred to by a "buffer_offset". The current playback position may be referred to by a "play_offset(M)". Thus, for example, a buffer mapping data structure may have the form: {buffer_offset, play_offset(M), bitmap}. In the illustrated example of FIG. 3, a corresponding buffer map data structure representing buffer map 203 may be: {80, 84, 1111 1111 0000 1010}, which indicates that the buffer_offset position begins at chunk ID 80, and the current play_offset(M) is at chunk ID 84; and the bitmap portion of this data structure indicates that data chunks 80-83 are available (as indicated by the first four "1's" in the bitmap), data chunks 84-87 are available (as indicated by the second four "1's" in the bitmap), data chunks 88-91 are not available (as indicated by the next four "0's" in the bitmap), and data chunks 92 and 94 are available but data chunks 93 and 95 are not yet available (as indicated by the final "1010" in the bitmap). Thus, the previously-played portion of data that is still buffered in buffer 202 of peer $P_i$ in this example is chunk IDs 80-83, which are available for sending to another neighboring peer that may request such data from peer $P_i$. Further, the to-be-played portion of the streaming media file includes chunk IDs 84-95, of which chunks 84-87, 92, and 84 are available at peer $P_i$ (and may be sent to another neighboring peer that requests such data from peer $P_i$) and chunks 88-91, 93, and 95 are still needed by peer $P_i$. Thus, scheduler 204 is to request the unavailable chunks 88-91, 93, and 95 from neighboring peers of peer $P_i$ in an effort to obtain those chunks before their respective playback time at peer $P_i$ to maintain a substantially smooth playback of the streaming media file at peer $P_i$.

Figure 4:
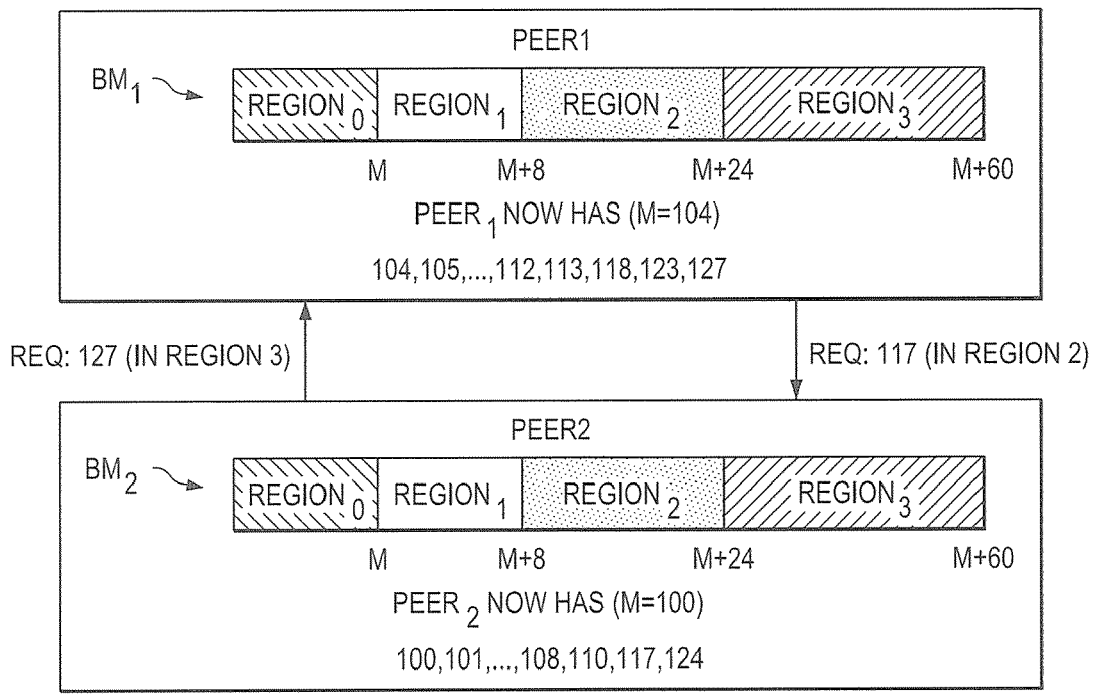
FIG. 4 shows a diagram illustrating an example of operation of one embodiment of the present invention.

FIG. 4 shows a diagram illustrating an example of operation of one embodiment of the present invention. In FIG. 4, two peers, $Peer_1$ and $Peer_2$, are shown. Each peer has a respective buffer map that is divided into time-urgency ordered regions. For instance, $Peer_1$ has a buffer map $BM_1$, and $Peer_2$ has a buffer map $BM_2$. Each of $BM_1$ and $BM_2$ may comprise chunk IDs and a corresponding bitmap that indicates which of the identified chunks are available at the peer in the maimer as discussed above for buffer map 203 shown in FIG. 3. In this example, each buffer map is divided into four (4) regions. One region, $Region_0$, identifies data previously-played data chunks that are still available at the respective peer. The three (3) remaining regions are time-urgency ordered regions of to-be-played streaming data. A first of these 3 regions, $Region_1$, is from M to M+7 (where M is a current playback position of the respective peer), a second of these regions, $Region_2$, is from M+8 to M+23, and a third of these regions, $Region_3$, is from M+24 to M+60. Thus, $Region_1 = \{M, M+1, \ldots, M+7\}$; $Region_2 = \{M+8, M+9, \ldots, M+23\}$; and $Region_3 = \{M+24, M+25, \ldots, M+60\}$. As can be seen, the first of the to-be-played regions, $Region_1$, is most time urgent because it contains the data chunks that are about to be played in the immediate future, whereas $Region_2$ is of lesser urgency because it contains data chunks to be played following playback of the chunks in $Region_1$, and $Region_3$ is of even lesser urgency because it contains data chunks to be played following playback of the chunks in $Region_2$.

In the illustrated example of FIG. 4, $Peer_1$ has a current playback position of M=104, and $Peer_2$ has a current playback position of M=100. Further, $Peer_1$ requests from $Peer_2$ data chunk 117 (which is available in $Region_2$ of $Peer_2$), and $Peer_2$ requests from $Peer_1$ data chunk 127 (which is available in $Region_3$ of $Peer_1$).

Figure 5:
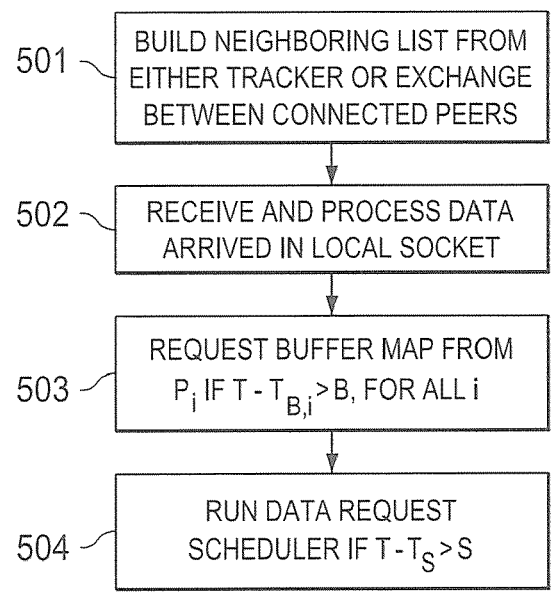
FIG. 5 shows an operational flow diagram for one embodiment of the present invention.

FIG. 5 shows an operational flow diagram for one embodiment of the present invention. In operational block 501, a neighboring list is built for a given peer. Such neighboring list may be constructed from either a tracker server (e.g., tracker server 108 of FIG. 1) or through exchange between connected peers, as examples. In operational block 502, data that arrives in a local socket of the given peer is received and processed by such peer.

Consider the following definitions for this exemplary embodiment:

$P_i$: peer i;
T: current time in seconds;
B: predefined time (e.g., 1 second);
$T_{B,i}$: time receiving latest buffer map from $P_i$;
$T_S$: time when last data request scheduler is called; and
S: predefined data scheduling interval (e.g., 0.2 seconds).

In operational block 503, a buffer map is requested from peer $P_i$ if $T-T_{B,i} > B$, for all i. In operational block 504, data request scheduler (e.g., scheduler 204 of FIG. 2) is run if T-T$_s$>S. Exemplary implementations of operational blocks 502 and 504 according to certain embodiments of the present invention are discussed further below with reference to FIGS. 6 and 7, respectively.

Figure 6:
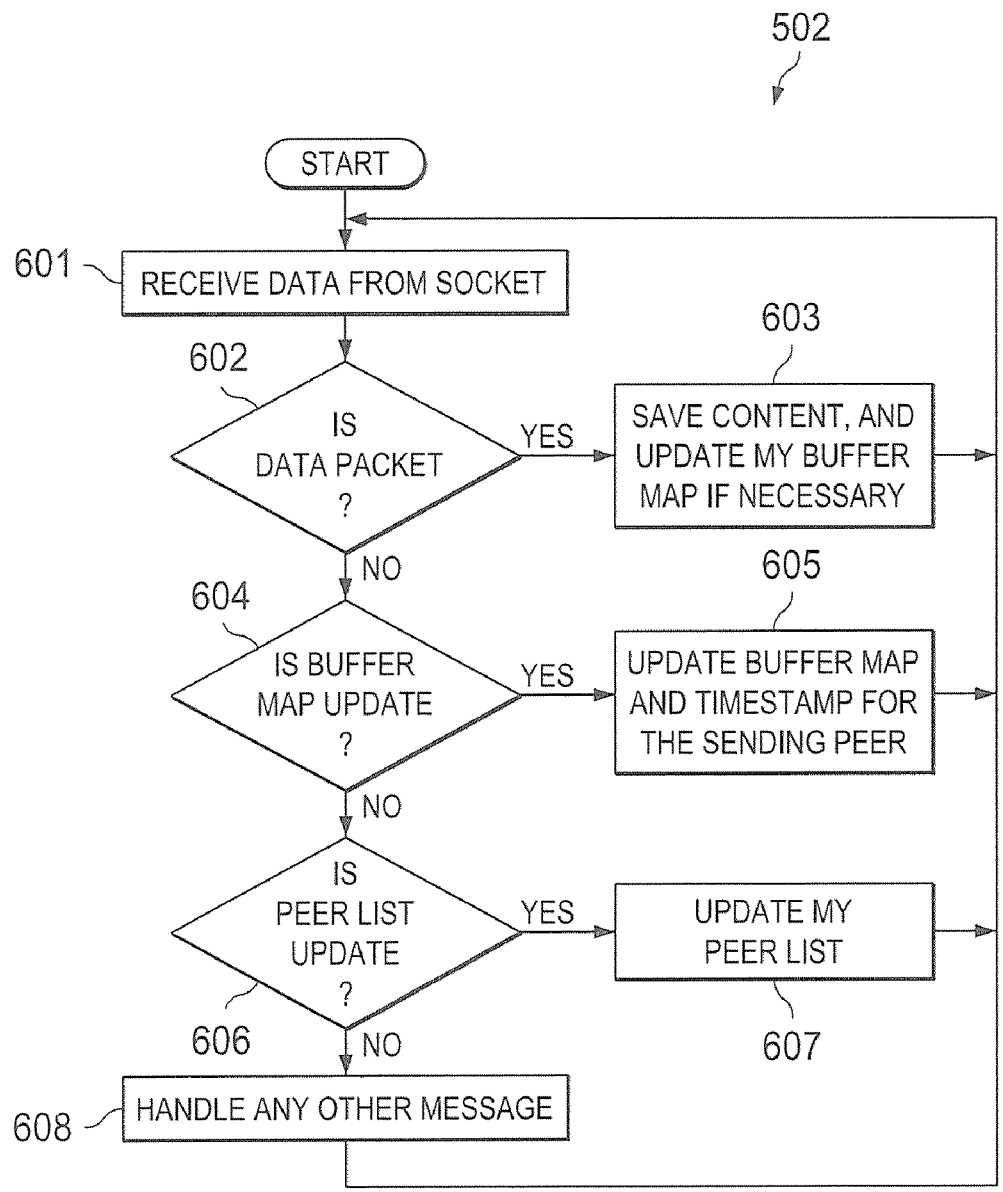
FIG. 6 shows an exemplary flow diagram for performing operational block 502 of FIG. 5 according to one embodiment of the present invention.

FIG. 6 shows an exemplary flow diagram for performing operational block 502 of FIG. 5 according to one embodiment of the present invention. In operational block 601, data is received from the peer's local socket (e.g., via network layer 206 of FIG. 2). In block 602, the peer determines whether the received data is a data packet. If so, the content of the data packet is saved (to buffer 202 of FIG. 2), and the peer updates its buffer map 203, if necessary (i.e., if the received data packet results in a new data chunk being available).

If determined in block 602 that the received data is not a data packet, operation advances to block 604 where the peer determines whether the received data is a request for a buffer map update. As discussed above, peers may periodically request buffer maps from their neighboring peers, such as once every second. If the received data is determined in block 604 to be a buffer map update request, the peer updates its buffer map and timestamp for the requesting peer (who sent the received data to the peer) in operational block 605.

If determined in block 604 that the received data is not a request for a map update, operation advances to block 606 where the peer determines whether the received data is a peer list update request. If so, then the peer updates its peer list in block 607. As new neighboring peers are added and/or as neighboring peers depart the P2P network, the peer updates its peer list (e.g, from tracker server 108 of FIG. 1 or through exchange of information with neighboring peers).

If determined in block 606 that the received data is not a peer list update request, operation advances to block 608 to handle any other type of data (e.g., message) that may be received by the peer. In any event, once the received data is processed, operation may return to block 601 to receive further data from the peer's local socket.

As discussed further herein, desired fullness rules may be defined for each of the time-urgency ordered regions of a peer's buffer map. That is, a desired target amount of (e.g., percentage of) data chunks that are desired to be available in each of the defined regions of the buffer map may be predefined. According to embodiments of the present invention, a peer's scheduler 204 requests data from other peers according to fullness rules defined for each of the regions in the peer's buffer map 203 (of FIG. 2).

For instance, a target amount of $F_1$ fullness may be defined for Region$_1$, a target amount of $F_2$ fullness may be defined for Region$_2$, and a target amount of $F_3$ fullness may be defined for Region$_3$. Generally, the higher-urgency regions have a higher target fullness amount defined. For instance, $F_1$ may be defined as 100%, where 100% of the data chunks in Region$_1$ are desired to be available at the peer; $F_2$ may be defined as 50%, where 50% of the data chunks in Region$_2$ are desired to be available at the peer; and $F_3$ may be defined as 30%, where 30% of the data chunks in Region$_3$ are desired to be available at the peer. The peer's scheduler 204 may monitor the fullness of each region of the peer's buffer map 203, and schedules requests of data chunks from other peers based at least in part on the defined target amount of fullness desired to be maintained for each region.

According to one embodiment, the scheduler determines for all regions $\{1, 2, \ldots, N\}$, whether the region meets its defined fullness target, and if a region does not meet its defined fullness target, the scheduler chooses one unavailable chunk from that region that has not yet been requested from another peer (i.e., is not in the request queue ($Q_{Req}$)). In certain embodiments, an unavailable chunk from the region may be randomly selected by the scheduler. Thus, the chunks need not be selected in time-ordered fashion, but rather the chunks may be selected for requesting their data from another peer in a non-sequential manner.

The peer may periodically exchange buffer maps with its neighboring peers, and thus the peer's scheduler can determine from the neighbor buffer maps (e.g., statistics and buffer maps 205 of FIG. 2) which neighbors have the chosen chunk. The scheduler 204 may select one of the neighbor peers ($P_k$) that has the chosen chunk, and sends a request to such selected neighbor peer $P_k$ requesting the chosen chunk of data. In certain embodiments, the one of the neighbor peers having the chosen chunk from which the chunk is requested may be selected randomly by the scheduler.

Figure 7:
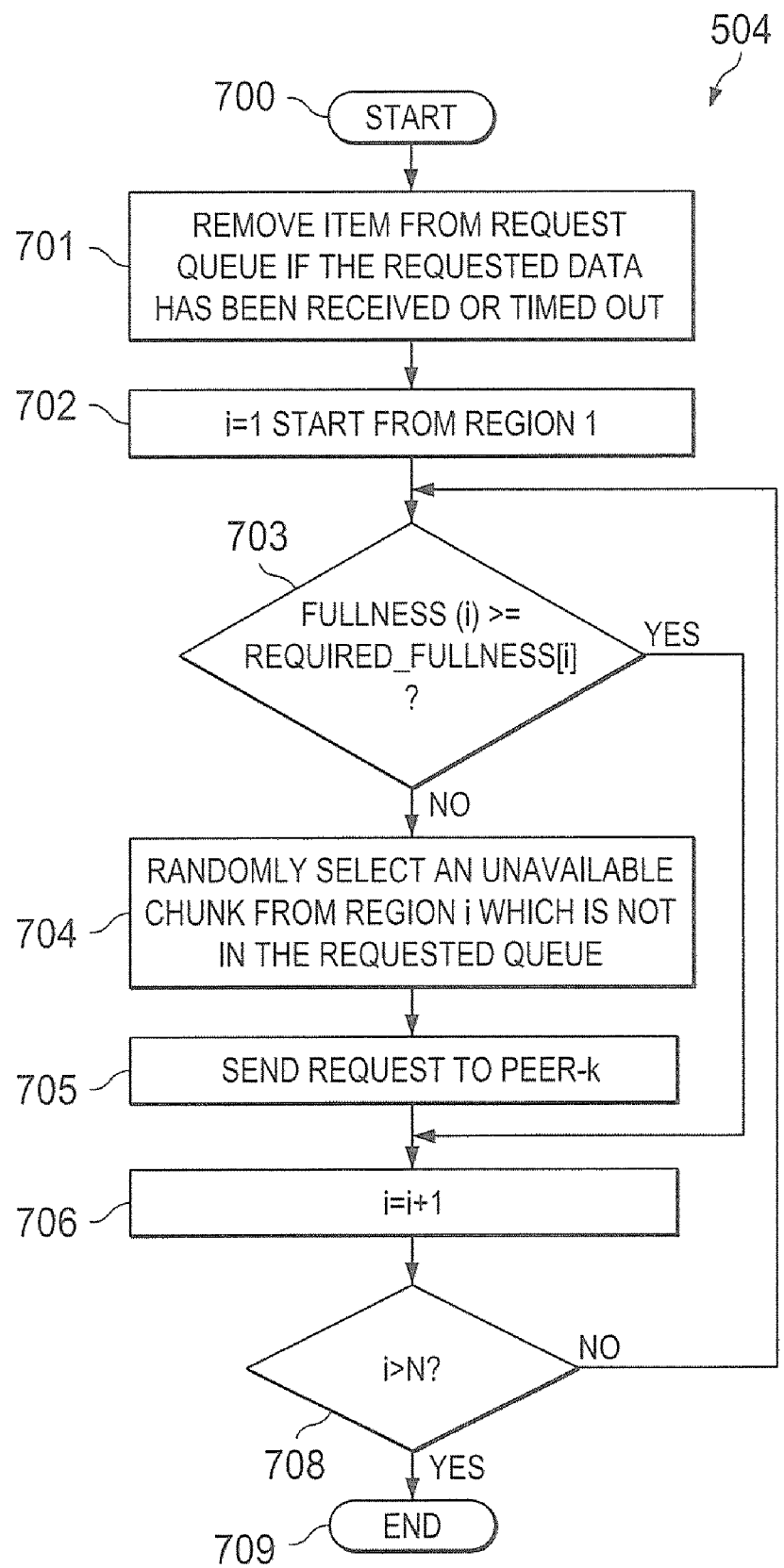
FIG. 7 shows an exemplary operational flow for the scheduling operation of block 504 of FIG. 5 according to one embodiment of the present invention.

FIG. 7 shows an exemplary operational flow for the scheduling operation of block 504 of FIG. 5 according to one embodiment of the present invention. In operational block 701, scheduler 204 (of FIG. 2) removes an item from the peer's request queue ($Q_{Req}$) if the requested data has been received or has timed out. In operational block 702, "i" is set to 1 to start the analysis of the buffer map regions at the most time-urgent region, Region$_1$. In block 703, the scheduler determines from the peer's buffer map 203 whether the current fullness of region "i" satisfies the predefined target fullness of such region i (i.e., fullness(i)>=required_fullness[i]). For instance, suppose that for Region$_1$ a predefined target fullness of 100% is specified (i.e., required_fullness[1] =100%); scheduler 204 determines in block 703 whether Region$_1$ is currently 100% full (i.e., has 100% of its data chunks available at the peer). If determined in block 703 that fullness(i) satisfies the predefined target fullness, then operation advances to block 706 discussed further below.

If determined in block 703 that fullness(i) does not satisfy the predefined target fullness (i.e., Region$_i$ under evaluation is not at least as full as predefined by required_fullness[i]), then operation advances to block 704 where scheduler 204 randomly selects an unavailable chunk from region i which is not in the peer's request queue. Then, in block 705 scheduler 204 selects a neighboring peer, Peer$_k$, at which the selected unavailable chunk is available (e.g., any one of a plurality of different neighboring peers at which the selected unavailable chunk is available may be randomly selected by scheduler 204), and scheduler 204 sends a request for the selected unavailable chunk to the neighboring peer, Peer$_k$.

In operational block 706, "i" is incremented to evaluate the next region of the buffer map. In operational block 708, scheduler 204 determines whether i>N, where N is the total number of to-be-played regions of the buffer map. If so, then all of the buffer map regions have been evaluated, and operation may end in block 709 (and/or be periodically repeated by returning to operational block 701). If all regions have not been evaluated (i.e., i<=N), then operation advances from block 708 to block 703 for evaluating the next region "i" of the peer's buffer map 203.

According to one embodiment, buffer maps are exchanged between neighboring peers periodically (say, every 1 second). The scheduler algorithm of FIG. 7 may be run periodically (say, every 0.2 seconds).

FIG. 8 shows another exemplary operational flow diagram according to one embodiment of the present invention. In operational block 81, streaming media content to be played by a peer in a P2P network is logically divided into a plurality of time-ordered data chunks. As shown in optional sub-block 801, each data chunk may be of a predefined length, say 1 second, of playback time of the streaming media content. In block 82, a buffer map of the peer (e.g., buffer map 203 of FIG. 2) is partitioned into a plurality of time-urgency ordered regions. In block 83, a respective target fullness amount is defined for each of the regions. As shown in optional sub-block 802, the target fullness amount may vary from region-to-region depending on the corresponding time urgency of each region. For example, the target fullness amount defined for a first region of great time urgency may be a higher target fullness amount than the target fullness amount defined for another region of lesser time urgency.

In block 84, the buffer map is populated with information that identifies at least a plurality of to-be-played data chunks of the streaming media content, such as the exemplary chunk IDs 301 discussed above with FIG. 3. In block 85, the buffer map is populated with information (e.g., bitmap 302 of FIG. 3) that indicates which of the plurality of to-be-played data chunks are available at the peer.

In operational block 86, each the plurality of to-be-played data chunks is assigned to one of the plurality of time-urgency ordered regions of the buffer map according to relative time urgency of the plurality of to-be-played data chunks. Then, in block 87, a schedule is determined for requesting one or more of the to-be-played data chunks from one or more neighboring peers based at least in part on the buffer map and the defined target fullness amounts of the regions. For instance, as shown in the optional sub-blocks 803-805, in certain embodiments determining the schedule comprises determining, for each of the time-urgency ordered regions, an amount of the region's assigned to-be-played data chunks that are available at the peer (block 803); determining, for each of the time-urgency ordered regions, whether the determined amount of available to-be-played data chunks of the region satisfies the respective target fullness amount defined for the region (block 804); and when determined that the amount of available to-be-played data chunks of a region does not satisfy the region's target fullness amount, then scheduling a request of at least one of the unavailable to-be-played data chunks of that region from a neighboring peer (block 805).

Many of the elements described herein, when implemented via computer-executable instructions, are in essence the software code defining the operations thereof. For instance, the above-described scheduler 204 may comprise software code for performing the corresponding operations described. The executable instructions or software code may be obtained, for example, from a readable medium (e.g., a hard drive media, optical media, EPROM, EEPROM, tape media, cartridge media, flash memory, ROM, memory stick, and/or the like). In certain embodiments, a CPU may execute the various logical instructions according to embodiments of the present invention. For example, a CPU may execute machine-level instructions according to the exemplary operational flows described above in conjunction with FIGS. 5-8.

It shall be appreciated that the present invention is not limited to the architecture of the system on embodiments thereof may be implemented. For example, any suitable processor-based device may be utilized for implementing the above-described peers in a P2P network, including without limitation personal computers, laptop computers, computer workstations, and multi-processor servers. Moreover, certain aspects of embodiments of the present invention (e.g., for implementing scheduler 204) may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   logically dividing streaming media content to be played by a peer in a peer-to-peer (P2P) network into a plurality of time-ordered data chunks;
   partitioning a buffer map on the peer into a plurality of time-urgency ordered regions;
   defining, for each of the regions, a respective target fullness amount;
   populating the buffer map with information that identifies at least a plurality of to-be-played data chunks of the streaming media content;
   populating the buffer map with information that indicates which of the plurality of to-be-played data chunks are available at the peer;
   assigning each the plurality of to-be-played data chunks to one of the plurality of time-urgency ordered regions of the buffer map according to relative time urgency of the plurality of to-be-played data chunks; and
   determining a schedule for requesting one or more of the to-be-played data chunks from one or more neighboring peers based at least in part on the buffer map and the defined target fullness amounts of the regions.

2. The method of claim 1 wherein said determining the schedule comprises:
   determining, for each of the time-urgency ordered regions, an amount of the region's assigned to-be-played data chunks that are available at the peer;
   determining, for each of the time-turgency ordered regions, whether the determined amount of available to-be-played data chunks of the region satisfies the respective target fullness amount defined for the region; and
   when determined that the amount of available to-be-played data chunks of a region does not satisfy the region's target fullness amount, then scheduling a request of at least one of the unavailable to-be-played data chunks of that region from a neighboring peer.

3. The method of claim 2 wherein said scheduling a request of at least one of the unavailable to-be-played data chunks of that region from a neighboring peer comprises:
   selecting an unavailable to-be-played data chunk of that region to be requested from a neighboring peer.

4. The method of claim 3 wherein said selecting comprises randomly selecting from all unavailable to-be-played data chunks of that region said unavailable to-be-played data chunk to be requested from a neighboring peer.

5. The method of claim 3 wherein said selecting is not required to select a most time urgent one of unavailable to-be-played data chunks of that region.

6. The method of claim 3 wherein said scheduling a request of at least one of the unavailable to-be-played data chunks of that region from a neighboring peer further comprises:
  determining one or more neighboring peers at which the selected unavailable to-be-played data chunk is available.

7. The method of claim 6 wherein said determining said one or more neighboring peers comprises:
  periodically receiving at said peer respective buffer maps for neighboring peers; and
  determining from said received buffer maps said one or more neighboring peers at which the selected unavailable to-be-played data chunk is available.

8. The method of claim 6 further comprising:
  selecting one of said one or more neighboring peers at which the selected unavailable to-be-played data chunk is available from which to request the unavailable to-be-played data chunk.

9. The method of claim 8 wherein said selecting said one of said one or more neighboring peers comprises:
  randomly selecting said one of said one or more neighboring peers.

10. The method of claim 1 wherein defining, for each of the regions, said respective target fullness amount comprises:
  defining a first target fullness amount for a first of said regions;
  defining a second target fullness amount for a second of said regions;
  wherein said first of said regions has greater time-urgency than said second of said regions, and wherein said first target fullness amount is greater than said second target fullness amount.

11. The method of claim 10 wherein said first of said regions has greater time-urgency because it is assigned ones of said plurality of to-be-played data chunks that are to be played before ones of said plurality of to-be-played data chunks that are assigned to said second of said regions.

12. The method of claim 1 wherein defining, for each of the regions, said respective target fullness amount comprises:
  defining a different target fullness amount for each of the regions in relation to the relative time urgency of each of the regions.

13. The method of claim 1 wherein said target fullness amount defined for one of the regions specifies an amount of to-be-played data chunks assigned to said one of the regions that are desired to be available at the peer.

14. The method of claim 13 wherein a data chunk is available at the peer once all data packets of the data chunk have been received at the peer.

15. The method of claim 1 wherein each of said plurality of time-ordered data chunks comprises a predefined length of playback time of the streaming media content.

16. The method of claim 1 wherein the streaming media content comprises live streaming media content.

17. A method comprising:
  logically dividing streaming media content to be played by a peer in a peer-to-peer (P2P) network into a plurality of time-ordered data chunks;
  partitioning a buffer map on the peer into a plurality of time-urgency ordered regions;
  defining, for each of the regions, a respective target fullness amount;
  populating the buffer map with information that identifies at least a plurality of to-be-played data chunks of the streaming media content;
  populating the buffer map with information that indicates which of the plurality of to-be-played data chunks are available at the peer;
  assigning each the plurality of to-be-played data chunks to one of the plurality of time-urgency ordered regions of the buffer map according to relative time urgency of the plurality of to-be-played data chunks;
  for each of the time-urgency ordered regions, determining whether an amount of available to-be-played data chunks therein satisfies the region's corresponding target fullness amount; and
  when determined that the amount of available to-be-played data chunks in one of the time-urgency ordered regions does not satisfy the region's corresponding target fullness amount, selecting an unavailable to-be-played data chunk from the one of the time-urgency ordered regions for requesting from a neighboring peer.

18. The method of claim 17 wherein said selecting said unavailable to-be-played data chunk comprises randomly selecting from all unavailable to-be-played data chunks of said one of the time-urgency ordered regions said unavailable to-be-played data chunk to be requested from a neighboring peer.

19. The method of claim 17 wherein said selecting is not required to select a most time urgent one of unavailable to-be-played data chunks of said one of the time-urgency ordered regions.

20. The method of claim 17 wherein defining, for each of the regions, said respective target fullness amount comprises:
  defining a different target fullness amount for each of the regions in relation to the relative time urgency of each of the regions.

21. The method of claim 17 wherein said target fullness amount defined for one of the regions specifies an amount of to-be-played data chunks assigned to said one of the regions that are desired to be available at the peer.

22. The method of claim 21 wherein a data chunk is available at the peer once all data packets of the data chunk have been received at the peer.

23. The method of claim 17 wherein the streaming media content comprises live streaming media content.

24. A system comprising:
  a peer communicatively coupled to one or more other peers via a peer-to-peer (P2P) network said peer comprising:
    a player for rendering streaming content;
    a buffer for buffering streaming content for playing by the player;
    a buffer map that includes
      a) information identifying at least a plurality of to-be-played time-ordered data chunks of the streaming media content, and
      b) a bitmap indicating which of the plurality of to-be-played data chunks are available at the peer;
    wherein the buffer map is partitioned into a plurality of time-urgency ordered regions, and each the plurality of to-be-played data chunks is assigned to one of the plurality of time-urgency ordered regions of the buffer map according to relative time urgency of the plurality of to-be-played data chunks;
    a scheduler for requesting one or more of the to-be-played data chunks from one or more neighboring peers based at least in part on the buffer map and target fullness amounts predefined for the plurality of time-urgency ordered regions.

25. The system of claim 24 wherein said scheduler is configured to:

determine, for each of the time-urgency ordered regions, an amount of the region's assigned to-be-played data chunks that are available at the peer;

determine, for each of the time-urgency ordered regions, whether the determined amount of available to-be-played data chunks of the region satisfies a respective target fullness amount defined for the region; and when determined that the amount of available to-be-played data chunks of a region does not satisfy the region's target fullness amount, schedule a request of at least one of the unavailable to-be-played data chunks of that region from a neighboring peer.

* * * * *

UNITED STATES PATENT AND TRADEMARK OFFICE
CERTIFICATE OF CORRECTION

| | | |
|---|---|---|
| PATENT NO. | : 7,991,906 B2 | Page 1 of 1 |
| APPLICATION NO. | : 12/331360 | |
| DATED | : August 2, 2011 | |
| INVENTOR(S) | : Chun Y. Ng et al. | |

It is certified that error appears in the above-identified patent and that said Letters Patent is hereby corrected as shown below:

In the Specification:

Column 5, Line 25, delete the portion of text reading "fillness" and replace with --fullness--.

In the Claims:

Column 14, Claim 2, Line 47, delete the portion of text reading "time-turgency" and replace with --time-urgency--.

Signed and Sealed this
Fourth Day of October, 2011

David J. Kappos
*Director of the United States Patent and Trademark Office*